April 22, 1952            G. F. WALES            2,593,506
METHOD AND APPARATUS FOR PUNCHING MATERIALS
WITH SCREWS AND LODGING SAME THEREIN
Filed July 19, 1944                          4 Sheets—Sheet 1
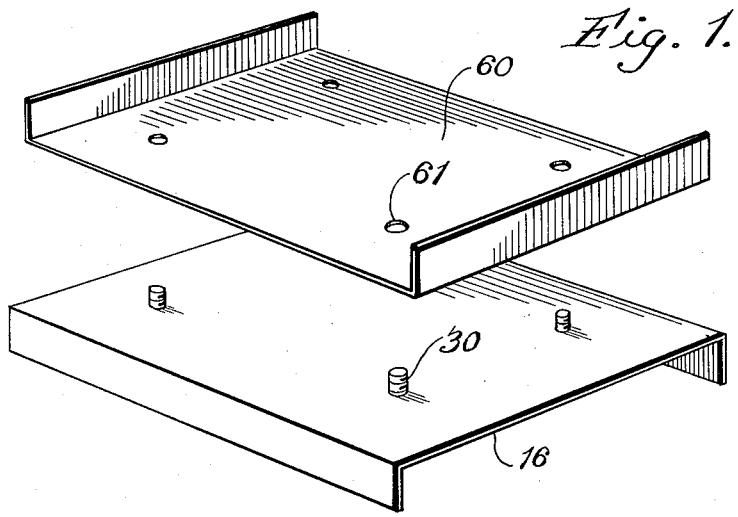
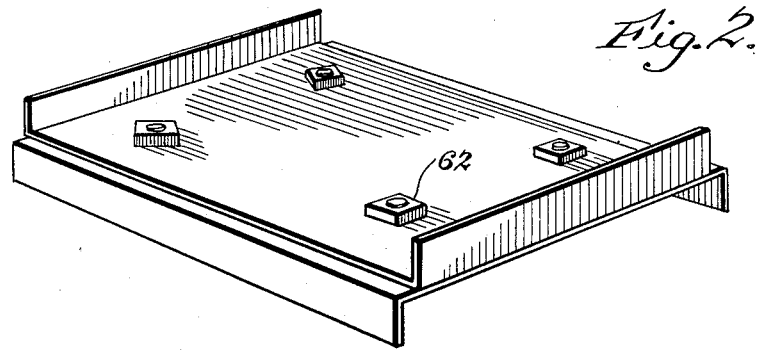
INVENTOR.
George F. Wales

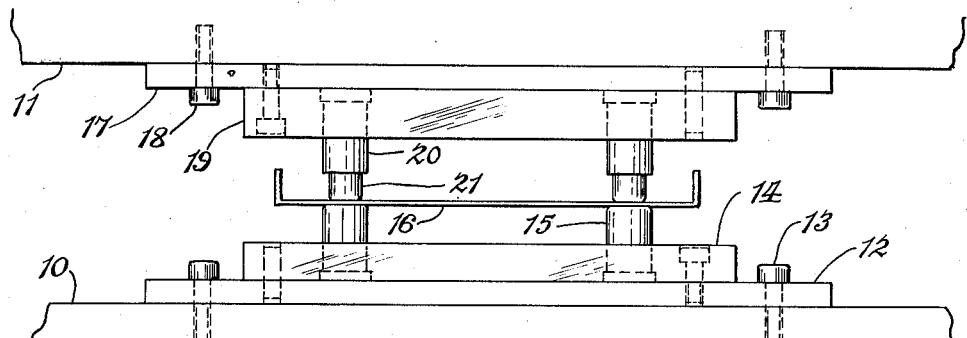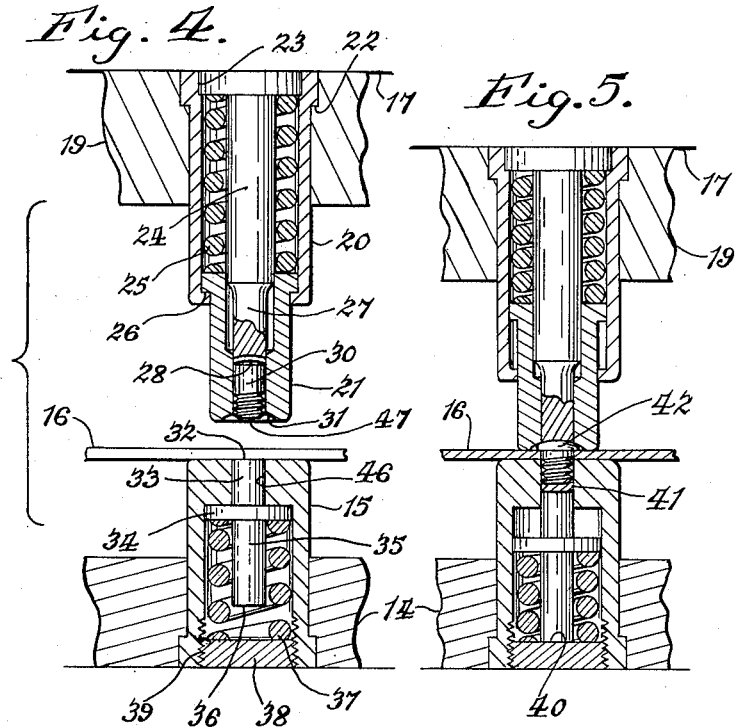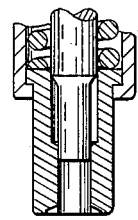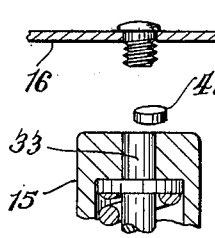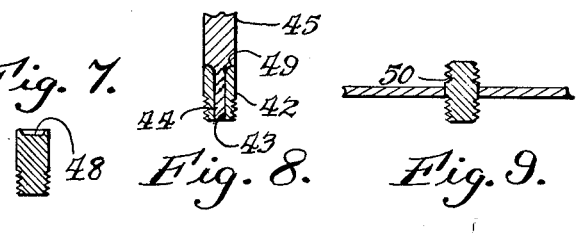

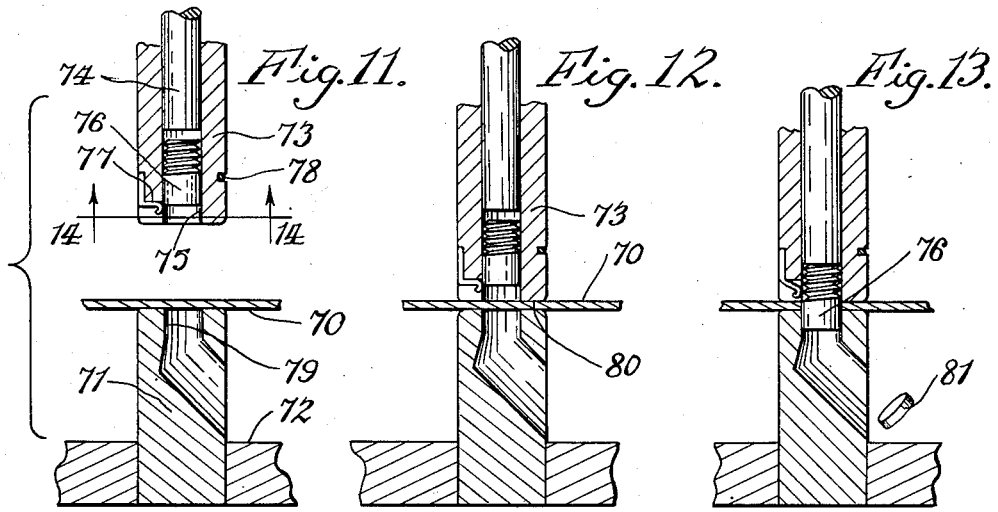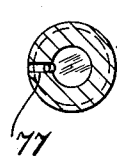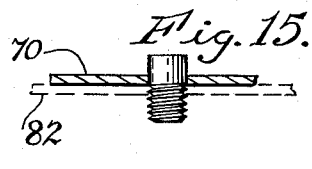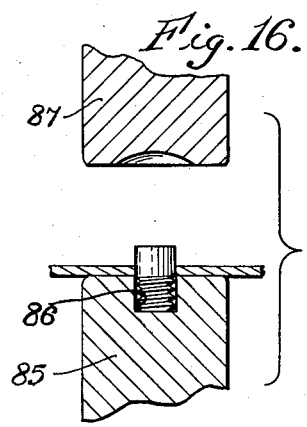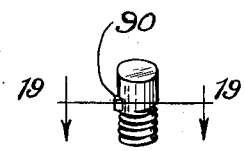

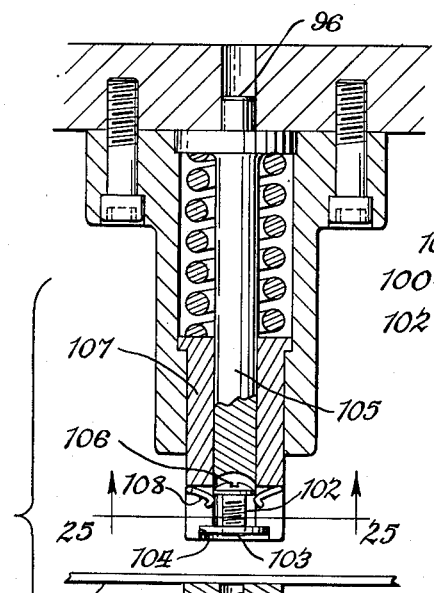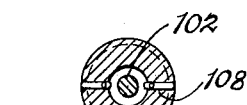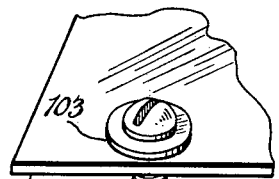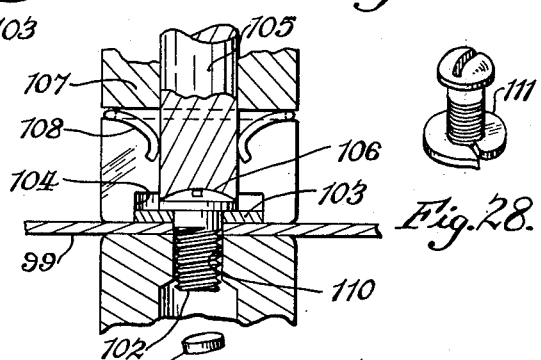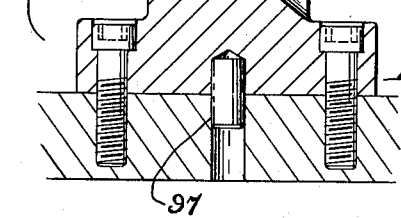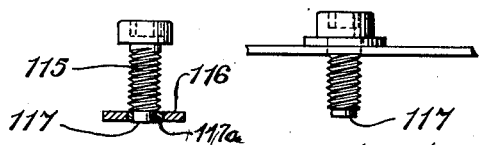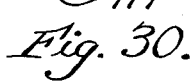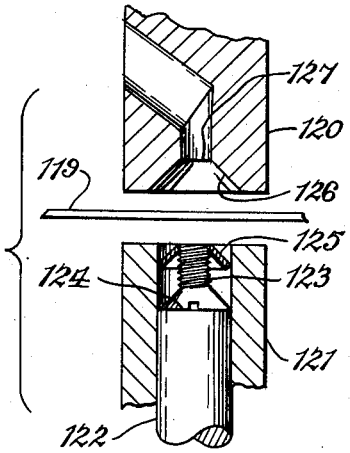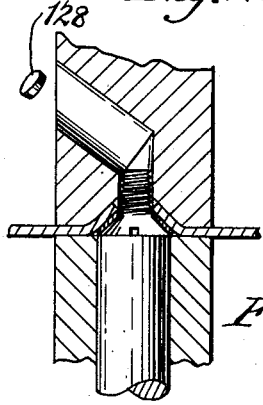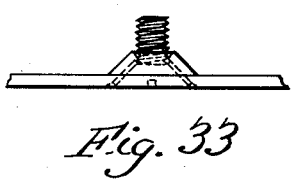

Patented Apr. 22, 1952

2,593,506

UNITED STATES PATENT OFFICE 2,593,506

METHOD AND APPARATUS FOR PUNCHING MATERIALS WITH SCREWS AND LODGING SAME THEREIN

George F. Wales, Kenmore, N. Y.

Application July 19, 1944, Serial No. 545,686

14 Claims. (Cl. 10—10)

This invention relates to a method and apparatus for punching holes in metal members, such as sheets, plates, bars, structural steel shapes, rails and the like although the same may be used in making holes or openings in any other material to which the method and elements may be adapted. It more particularly relates to a method of punching holes in such members by substituting for the punch-bit as described in my Patent No. 2,419,862, a punch-bit which remains in the work-piece to be used as a screw fastening means.

It has been the practice heretofore when two or more work-pieces were to be joined by screws, to provide holes through which a screw having a head has been inserted and then a nut has been threaded on the opposite end to bind the pieces between the head and the nut.

The companion holes in the members to be fastened together have been formed by various means, such as punching each piece separately or drilling each member separately, it having been necessary, in such cases, that the holes matched exactly so that the screws could be inserted easily.

In instances where the holes have not matched properly it has been necessary to use an alining tool which has usually taken the form of a taper drift pin. This pin has been inserted into a pair of companion holes adjacent to those in which the screw was to be inserted and used as a pry to move the pieces in relation to one another. This not only has taken considerable time but is expensive. Furthermore, the springing and warping of the metal has caused the holes to get out of alinement and it has been necessary to redrill to be able to insert the screw. If the holes have been originally made of a diameter slightly larger than the diameter of the screw threads, then redrilling has caused the hole in one of the members to be made irregular in shape, which is an undesirable condition.

On the other hand, considerable work of this nature is done by forming holes in a work-piece and then placing it in an assembly fixture which holds a second work-piece against it. Then drills are run through the holes in the first work-piece to drill the companion hole in the second work-piece. Often times the holes which are provided in the first piece, either by punching or drilling, are slightly smaller than the hole required for the screw and in such instances, of course, the hole in the first work-piece has been enlarged slightly in the final drilling operation.

After the holes had been formed in the work-pieces it has been necessary in the manufacture of metal products such as trucks, trailers, automobiles, railroad cars, furniture, stoves, cabinets, etc., for one operator to work on one side of the product inserting screws in the holes and holding a wrench or screw driver to keep each of them from turning while another operator worked on the other side of the product to attach and tighten the nuts.

The principal object of this invention is to provide a method of punching a plurality of holes in metal by a process of transferring a multiplicity of fastening mediums from an apparatus which utilizes them, first as punch elements, and then leaves them lodged in the work-piece to be used as a fastening means for attaching other work-pieces to said first work-piece and making it unnecessary for a second operator to insert or hold the screws at assembly.

It is a further object to provide a device of this nature in which a multiplicity of fastening means are lodged in the work-piece and are headed in the same stroke of the ram of the machine, thereby leaving the fastening means tightly held in the work-piece with an enlarged head on one side and the body projecting a predetermined distance from the other side.

Another object is to provide a method and apparatus for punching a plurality of holes through two or more work-pieces by using a multiplicity of fastening mediums and using said mediums as the punch elements and then leaving said mediums lodged in said work-pieces so that they are held together by the binding of said work-piece holes around said mediums until same can be headed subsequently and a nut applied to hold said work-pieces together.

It is another object to provide a device of this nature whereby a multiplicity of fastening mediums such as described, may be first utilized as punch-bits to be driven through one or more work-pieces and have one end of said mediums headed simultaneously.

It is a further object to provide the method and apparatus whereby a multiplicity of fastening mediums which have been lodged in one or more work-pieces may be headed on one end after having been lodged in at least one of the work-pieces.

It is a further object to provide a method of assembly whereby one work-piece having fastening means lodged in it has a second piece having holes already provided to accommodate said fastening means placed over same and the fastening means headed on one end.

It is a further object to provide a screw having the characteristics of being hard enough on the leading or punching tip to penetrate the work-pieces properly and at the same time being sufficiently ductile to flow on the opposite end under the pressure of subsequent heading operations.

It is a further object to provide a combination punch-bit and fastening medium in which the threaded end is hardened and is used as the punching element.

It is a further object to provide a combination screw and punch-bit which is provided with means for forming an anti-turning jointure in the member in which it is lodged.

These objects and the several novel features of the invention are hereinafter more fully described and claimed and the preferred form of construction by which these objects are obtained is shown in accompanying drawings in which:

Fig. 1 is a perspective view of a work-piece having screw elements embedded according to this invention and showing a second work-piece which has been prepared for attachment to the first work-piece by having holes formed in it to accommodate said screw elements.

Fig. 2 is a perspective view of the members shown in Fig. 1 assembled together and with nuts applied on the screws.

Fig. 3 is a side elevation of one type of apparatus by which this method may be utilized.

Fig. 4 is a cross-section of a preferred form of punch and die device showing the punching screw element in place in the aperture of the punch guide and the slug ejecting and bottoming means which limits the downward travel of the punching screw element after it has penetrated the work-piece. This view shows the punch as it approaches the work in the downward movement of the ram of the press and just before it engages the work-piece.

Fig. 5 is a cross-section view showing the same device as in Fig. 4 in its lowermost position with the slug having been punched out of the work by means of the threaded end of the punching screw and then showing how the upper portion of the screw is swaged into a head. It also shows how the bottoming pin in the die element has been depressed to bear against the adjustable screw plug in the bottom of the die holder.

Fig. 6 is a partial cross-section of the device illustrated in Figs. 4 and 5 after the operation has been performed and shows how the work-piece and screw appear after being ejected from the die and also how the punched out slug is ejected at the same time.

Fig. 7 illustrates a form of a punching screw provided with a relief to aid the heading operation.

Fig. 8 illustrates a form of punching screw having a hole lengthwise through its axis and shows how such a screw is placed on a punch having a pilot to retain and guide it prior to lodging the screw in a work-piece.

Fig. 9 is a section of a work-piece having a screw with threads on both ends lodged in it.

Fig. 10 is a perspective view of a punching screw showing that if desired, a slot may be formed into the head by preparing the punch of Fig. 5 with a bottom end to accomplish this result.

Fig. 11 is a partial sectional view of an alternative method wherein the punching screw is inverted in the aperture of the punch guide and showing the punching mechanism as it approaches the work during the downward stroke of the ram. It also shows a clutch means for retaining the punching screw in its aperture before it becomes lodged in the work-piece.

Fig. 12 is a view of the same apparatus as shown in Fig. 11 and shows the punch guide in engagement with the work-piece just before the punching screw is driven into the work-piece.

Fig. 13 is a cross-section view of the apparatus shown in Figs. 11 and 12 showing the punching screw lodged in the work-piece and the slug which it has removed from same.

Fig. 14 is a section view taken on line 14—14 of Fig. 11.

Fig. 15 shows the work-piece with the screw lodged in it and inverted from the way it is shown in Fig. 13 for convenience in explaining the following two figures. The broken lines indicate that the screw may be lodged in more than one work-piece at the same time if desired.

Fig. 16 illustrates the work-piece shown in Fig. 15 preparatory to having its upper portion swaged into a head and with the swaging punch above the die member.

Fig. 17 shows the head swaging operation at the completion of its downward stroke.

Fig. 18 shows a form of punching screw with a means to prevent the screw from turning in a work-piece.

Fig. 19 is a cross-section view on line 19—19 of Fig. 18 showing one form of anti-turning device.

Fig. 20 is similar to Fig. 18 but shows the unthreaded portion of the punching screw knurled.

Fig. 21 is a partial sectional view showing another form of punching screw in which the straight portion is smaller in diameter than the threaded portion.

Fig. 22 is a partial section view showing the screw illustrated in Fig. 21 after it has been headed.

Fig. 23 is a perspective view of a screw having a head already on it and a guiding washer which is attached to the threaded end so as to retain that end of the screw in axial relation to the die element aperture when inserted in the guide sleeve as shown in Fig. 24, the washer being attached in such manner that it does not injure the threads of the screw when the screw is forced through it.

Fig. 24 is a vertical cross-section of a preferred type of apparatus construction by which the screw and washer shown in Fig. 23 is lodged in a work-piece.

Fig. 25 is a section view of the screw holder sleeve taken on line 25—25, Fig. 24 showing one form of catch for holding the screw and washer in place in the holder.

Fig. 26 is a perspective view showing how the screw and washer appear after the screw has been lodged in a work-piece.

Fig. 27 is an enlarged partial view of the unit shown in Fig. 24 at the bottom of its working stroke showing how the screw end has punched a slug out of the work-piece and lodged itself in same.

Fig. 28 is a view similar to Fig. 23 showing that the washer may be a spring lock washer if desired, or any other guiding medium.

Fig. 29 is another form of screw and guide washer in which the end of the screw is reduced and the washer attached, if desired, by means of a soft yieldable substance.

Fig. 30 shows the screw and washer illustrated in Fig. 29 assembled to the work-piece.

Fig. 31 is a partial view of the apparatus similar to that shown in Fig. 24, but in an inverted position so the screw and washer may be inserted in the lower apparatus member before performing the operation.

Fig. 32 is a view of the apparatus of Fig. 31 in its lowermost position.

Fig. 33 is a view of the screw and washer assembled in a work-piece as accomplished by the apparatus illustrated in Figs. 31 and 32.

This method of punching and lodging screw fastening means in work-pieces is adapted to be used in connection with any standard punch press or similar machine available which includes among other elements, a lower supporting bed which is mounted on the lower part of a stationary main frame and an upper ram which is guided on the upper part of this main frame and reciprocates vertically toward and from the bed. There are machines in which the lower part reciprocates toward and from a stationary part, but in describing this invention I shall limit my remarks to the first type to avoid confusion.

Also in the drawings I confine my illustrations to showing flat work-pieces and pieces with formed edges. It is to be understood that this does not limit the scope of this invention to these pieces, however, and that the use of the method and mediums anticipates all other work to which they are applicable.

In the space between the bed and the ram of the press the apparatus embodying my invention is arranged and adapted to be operated by the movement of the ram toward the bed for the purpose of providing the force for embedding the fastening mediums in the work-piece.

The different features of this method and related apparatus may be variously constructed and still embody the underlying principles of the invention and examples of the mechanical devices preferred are disclosed herein.

In the following description similar characters of reference indicate like parts in the central figures of the drawings.

In Fig. 1 numerals 16 and 60 represent two sheet metal members which are to be fastened together as illustrated in Fig. 2, by means of a multiplicity of bolts 30 and nuts 62. The conventional way of making this assemblage heretofore has been to punch holes as shown in member 60 in both of the members 16 and 60 and then to insert the bolts 30 through the pairs of holes and to apply and tighten the nuts 62. This usually requires two tools, namely a wrench to prevent the nut from turning and a screw driver or similar tool with which to turn the screw.

In Fig. 1 however, the member 16 has a multiplicity of screw elements embedded in it and these screw elements have been provided with heads as will be described later.

Let it be assumed, however, for the present that a multiplicity of screw elements 30 are tightly assembled to member 16 in such manner as to practically form an integral unit. It is the making of this assemblage that constitutes the present invention and the method and apparatus by which this is accomplished will be described later.

Assuming that the screws 30 are an integral part of member 16 then member 60 must, prior to assembly, be provided with a cooperating number of holes 61 so that the parts can be bolted together as illustrated in Fig. 2.

If the work-pieces are originally placed together, as shown in Fig. 2, but without the bolts and nuts, then a multiplicity of screw elements 30 may be driven through the two pieces at the same time.

Many types and designs of punch and die holders may be used and this invention anticipates all of them wherein a screw element is used to punch its own lodging place in a work-piece.

In Figs. 3, 4, 5, and 6 I show a preferred form of the apparatus by which this method may be used.

In Fig. 3, 10 represents a stationary bed of a press on which is firmly mounted a multiplicity of die elements 15 by means of a holder plate 14 and mounting plate 12, which is attached to the press bed by any conventional means, such as bolts 13. Member 11 represents the reciprocating ram of the press which carries the punch actuating elements 20 and 21 which are mounted in axial relation with die elements 15 and which are mounted to the ram of the press by means of holder plate 19 and mounting plate 17 which is attached to the ram by any conventional means such as bolts 18.

As shown in Fig. 4 the punch plate 19 and the punching unit which it carries, is shown with guide sleeve 21 slightly above the work. This is the position of the unit as the ram makes its downward stroke and as the unit approaches the work 16. At the top of its stroke, the space between the punching unit and work is somewhat greater than shown and this space is necessary in order to allow punching screws 30 to be inserted in the aperture of the punch actuating guide 21.

The details of the punching unit as shown in Figs. 4, 5 and 6 consists of a tubular holder 20 which is mounted in punch holder plate 19 and may be provided with an upper enlargement having a downwardly facing shoulder 22 to prevent any movement of the tube 20 in its plate 19. At its lowermost end, tube 20 is provided with a reduced portion to provide an upwardly facing shoulder so that a collar on punch guide sleeve 21 will engage same at 26 to limit the downward motion of said guide sleeve 21. The internal top portion of tube 20 is provided with an enlargement 23 to accommodate the head of punch actuator 24 and this punch actuator has a reduced portion 27 which is of the same size as the punching screw element 30. Around the punch actuator body 24 a spring element 25 is interposed between the under side of the head and the upper face of the guide sleeve 21 to apply pressure on the work-piece prior to driving the screw 30 into the work as illustrated in Fig. 4. The punching screw element 30 has a thread on one end and a convex head 28 on its other end, and the lower face of the punch actuator is formed to agree with this shape. The shape of this head end may be varied to suit and two examples are shown in Figs. 7 and 8.

The companion die assemblage as shown in Fig. 4 consists of a die holder plate 14 having a hole to accommodate die element 15 in the same manner that the punch tube 20 is held in punch plate 19.

Die element 15 is provided at its lower end with internal threads which accommodate the thread diameter 39 of bottoming plug 38. At its upper portion die member 15 is provided with an internal aperture 46 which cooperates with the lower bottom 47 of screw element 30 to remove the slug 41 as shown in Fig. 5.

In aperture 46 is the upper member 33 of the bottoming and slug ejecting member which also is provided with the large collar 34 in the lower pin 35. Surrounding pin 35 and bearing on the under side of collar 34, is spring element 37 which bears at its bottom face on plug 38, exerting sufficient pressure to eject slug 41 as illustrated in Fig. 6. Plug 38 is adjustable in holder 15 so that the distance the screw element 30 extends through work-piece 16 may be controlled to suit.

In operation the punching screw 30 is placed in the aperture of guide sleeve 21 and the ram is caused to make one stroke. As it approaches the work the guide sleeve 21 first contacts the work causing spring 25 to be compressed and the stroke causes the punch actuator 27 to drive the punching screw through the metal until the bottom 36 of the bottoming pin engages the plug at 40, after which continued movement causes the upper part of the punching screw to be headed as illustrated in Fig. 5.

As the punch actuating mechanism ascends after performing the work, it appears as illustrated in Fig. 6, which shows the screw tightly driven into the work-piece and headed and shows how the ejecting pin 33 removes slug 41 from the die aperture.

In order to make swaging of the head easier the upper end of the punching screw may be provided with a formed portion as shown at 49 in Fig. 7, or by any other shape.

While I prefer the organization of die and actuator parts as shown in Fig. 4 for lodging a punching screw in a work-piece where the screw is of solid construction, Fig. 8 illustrates how a hollow screw 42 may be placed on a punch 45 with pilot 44 locating the screw in axial relation to the punch body by means of hole 43. When this punch 45 is driven toward the work-piece on a die, the screw 42 is driven through the work by force against the end 49 and withdrawal of the punch leaves screw 42 remaining in the work.

Fig. 10 shows a screw head formed as described above with the exception that if desired, a slot 51 or any other type of depression may be formed by providing the work end 27 of the punch actuator with the necessary shape.

While in the previous description I have described this method and illustrated the operation by which a punching screw is lodged in a work-piece by using the threaded part as the punching end, it is obvious that this method may be used by using the opposite end of the screw element as the punching medium and in Figs. 11, 12 and 13 the preferred form of construction by which this is accomplished is illustrated and shall now be described.

Numeral 70 represents a work-piece resting on one of a plurality of die elements 71, mounted in the carrier plate 72. 73 represents guide sleeve similar to 21 in Fig. 4 and 74 the lower part of punch actuator, similar to 27 in Fig. 4 it being understood that the other details as illustrated in Fig. 4 may also be used in combination with the elements as shown in Fig. 11.

Sleeve 73 is provided with an aperture 75 in which punching screw 76 is placed before each operation. In order to retain the punching screw in the aperture, I provide a spring means similar to that indicated by numeral 77 which, in this instance, is in the form of a wire which encircles the diameter of sleeve 73 and is held in place in groove 78.

Die element 71 is provided with an internal aperture 79 which is in coaxial alinement with aperture 75 of sleeve 73. In operation, as the ram descends it approaches the work as illustrated in Fig. 11, until sleeve 73 contacts the work with its bottom face 80 and is caused to press against the work by means of a spring element similar to 25 Fig. 4.

As the ram continues its downward stroke, it presses slug 81 from the work-piece and lodges the punching screw 76 in same, as illustrated in Fig. 13. If desired, the punching screw 76 may be driven through two work-pieces at the same time as indicated by Fig. 15 in which 70 represents one work-piece and 82 represents the second work-piece.

Figs. 16 and 17 show how the punching screw is headed in a separate operation in order to show how this method is completed.

Obviously the screw may be headed separately where the screw is embedded in one or more work-pieces. In Fig. 16 the numeral 85 represents a screw accommodating die element having a well 86 to limit the downward movement of the screw and 87 is the heading tool which may be driven by any machine now used for that purpose to form the head as shown in Fig. 17.

Fig. 18 illustrates a means for preventing the screw from turning after it is assembled in a work-piece and this means may be of any form. By way of example, I show a projecting lug 90 which, when the screw embeds itself in the work, creates a niche to accommodate it as illustrated in Fig. 19.

In Fig. 20 an alternative form of screw where the body is knurled is indicated by numeral 91, and this knurled body forms serrations in the hole as it lodges itself in the work-piece.

In Fig. 21, I illustrate a form of punching screw wherein the shank 92 is smaller in diameter than the threaded portion 93 and this results in an assemblage as illustrated in Fig. 22.

So far I have illustrated and described this method and apparatus as it applies to screw elements which if heads are required, are headed either simultaneously with the lodging of the screw in the work or in a subsequent operation.

The method also may be used to lodge standard commercial screws having heads already on them in work-pieces and the heads may be of any style or shape. The apparatus must be made to accommodate the particular size and form of screw and obviously may vary in detail to suit conditions.

A preferred form of apparatus for lodging a screw having a head in a work-piece is illustrated in Figs. 24 and 27. While these views show the device as an individual unit it is to be understood that the greatest usage is in multiples and that the units may be mounted on templates as shown in my Patents 2,168,377 and 2,275,706 and may have the pilot locating means shown therein. Also this method may be used in the apparatuses covered by my Patents 1,955,866; 1,964,-752; 2,013,976; 2,163,641; 2,317,424; 2,319,568; 2,320,205; 2,334,138, 2,341,131, 2,361,668; 2,355,-344; 2,381,476; 2,364,011; 2,355,765; 2,380,485; 2,378,603; 2,364,574 and 2,410,372 as well as in my pending applications Serial Nos. 479,749, now Patent No. 2,553,615, granted May 22, 1951; and 498,453, now Patent No. 2,364,574, granted December 6, 1944.

For the present, however, I describe the method of lodging headed screws in the work as follows:

It is important that the threaded end of the screw be reasonably concentric with the die aperture if it is to punch a slug out of the work before being embedded therein. Certain screws having long heads remain concentric when placed in the sleeve of the punching unit but other shallow headed screws need some means for assuring this. A preferred means by which the screw is placed in the sleeve of the punching unit so that the threaded diameter is concentric with the die aperture is illustrated in Figs. 23 and 24.

In Fig. 23 numeral 100 represents a screw having a head 101 and a threaded end 102. 103 represents a guiding washer which is so constituted that its outer diameter is concentric with the screw diameter. This washer or guide is fastened to the screw by a yielding means which gives way when the screw starts to be driven through it. For instance, the thread in the washer may be cut away to be weakened to such an extent that while it still unites the screw and washer it breaks away as soon as the screw starts through it.

This is clearly illustrated in Fig. 24 where washer 103 is guided in seat 104 and this in turn holds screw threads 102 in an approximate concentric relation with die aperture 110. As the ram of the press descends it presses the punch actuator against the screw head 106 and drives the screw straight through the washer 103 and the work-piece 99 at the same time removing slug 98 as the screw acts as a punch in cooperation with the sharp die cutting edges of aperture 110. The result is as shown in Fig. 26 where the washer is shown pressed between the screw head and work-piece. This washer may be made of any material but when used with metal workpieces I prefer that a fibre or metal be used.

For holding the screw and washer in place in the guide sleeve 107 I provide a spring arrangement 108 as a retaining means.

Numeral 96 represents a pilot on the punch member in axial alinement with pilot 97 of the die member and these pilots are used to locate these members accurately on templates or die shoes as explained in my Patents 2,168,377 and 2,275,706.

In operation a multiplicity of screws and washers, which may be of various sizes if desired, are placed in their units as shown in Fig. 24 and driven through the work as shown in enlarged view of Fig. 27.

The washer may be of any shape or as shown in Fig. 28 may be a conventional spring lock washer as indicated by numeral 111.

In Figs. 29 and 30 I illustrate another form of screw 115 having a slightly reduced end 117 concentric with the screw body. On this end is attached by means of a firm adhesive 117a the washer 116. The adhesive may be a soft metal such as solder or any chemical composition to serve the purpose. As the screw penetrates the work the adhesive breaks away and the screw is driven into the work-piece as illustrated in Fig. 30.

Figures 31, 32 and 33 show how this method operates in an inverted position wherein 120 is a die element which is attached by means of a holder to the ram of a press and 121 is a guide sleeve which is supported at its lower end by a strong compression spring. 122 is a stationary punch on which the screw 123 rests as at 124. Attached to screw 123 is a frustro-conical washer 125 and the die element 120 is provided with a cooperating relieved portion 126. As die 120 descends it engages work-piece 119 and presses it against the guide sleeve 121. As the die continues downward it forces the metal over the screw threads until edge 127 severs the slug 128 and then further downward movement sets the work as shown in Fig. 23. The finished assemblage then appears as shown in Fig. 33.

Having thus described this invention describing my method of punching a work-piece and lodging a multiplicity of screw fastening mediums in same, it is to be understood that the method may be adapted to various products and this invention applies to anything wherein a screw fastening medium is lodged in a work-piece in a lodging place which it makes for itself. Although the forms shown in the drawings represent a practical embodiment of operating devices for my invention, it is also to be understood that the same may vary as to detail and still contain the essence of my improvements as summed up in the following claims.

I claim:

1. In a method of manufacture consisting in combining a multiplicity of screw mediums and a work-piece, the step of causing the threaded extremity of said mediums to form lodging places for the shank of said mediums in said work-piece by forcing material out of it and into receiving mediums and then swaging a head on each screw medium in the same operative stroke of a machine.

2. A method of lodging a screw in a work-piece consisting in placing a screw having a guide washer remote from the head, in an actuating device, placing a work-piece on a die medium, and then forcing the threaded body of said screw through said work-piece thereby driving a slug into the aperture of said die medium and confining said washer between said work-piece and said head.

3. A method of lodging a screw and countersinking a work-piece consisting in placing a countersunk head screw having a frusto-conical guide washer remote from said head, in an actuating device, placing a work-piece on said device and then forcing said screw through said work-piece thereby confining said washer between said work-piece and said head.

4. A method of lodging a washer between a screw head and work-piece which consists in yieldably attaching the washer to the threaded end of the screw placing the screw and washer in a holding device and actuating pressure means on said screw to lodge same in a work-piece held on a die element which cooperates with said screw to punch a slug from said work-piece into the aperture of said die element.

5. An apparatus for lodging a multiplicity of screws in a work-piece said apparatus comprising a plurality of die elements and a plurality of companion screw retaining and actuating devices for driving said screws through said work-piece while simultaneously removing material from said work-piece and forcing said material into the apertures of said die elements to form lodging places in said work-piece for said screws and means for limiting the movement of each of said screws through said work-piece.

6. An apparatus for lodging a multiplicity of screw bodies in a work-piece said apparatus comprising a plurality of die elements and a plurality of companion screw retaining and actuating devices for driving said screw bodies through said work-piece while simultaneously removing material from said work-piece and forcing said material into the apertures of said die elements to form lodging places in said work-piece for said screw bodies, means for limiting the movement of said bodies through said work-piece and means for forming a head on each of said screw bodies simultaneously.

7. An apparatus for lodging a multiplicity of screw bodies in a work-piece said apparatus comprising a plurality of die elements and a plurality of companion screw retaining and actuating devices for driving said screw bodies through said work-piece while simultaneously removing material from said work-piece and forcing said material into the apertures of said die elements to form lodging places in said work-piece for said screw bodies, and means for limiting the movement of said screw bodies through said work-piece and forming an enlarged head on one end of each of said screw bodies simultaneously.

8. An apparatus for lodging a multiplicity of screw bodies in a work-piece said apparatus comprising a plurality of die elements and a plurality of companion screw retaining and actuating devices for driving said screw bodies through said work-piece while simultaneously removing material from said work-piece and forcing said material into the apertures of said die elements to form lodging places in said work-piece for said screw bodies, means for limiting the movement of said screw bodies through said work-piece and then forming an enlarged head on one end of each of said screw bodies in a subsequent operation.

9. An apparatus for lodging a multiplicity of screws having a hollow core in a work-piece said apparatus comprising a plurality of die elements and a plurality of companion punches having pilots for cooperation with said hollow cores to axially aline said screws and punches and means for driving said screws through said work-piece while simultaneously removing material from said work-piece by forcing said material into the apertures of said die elements to form lodging places in said work-piece for said screws.

10. An apparatus for retaining a screw in a holder before driving said screw into a work-piece comprising a nest to accommodate said screw, clutching means to retain said screw in said nest and means to guide said screw into proper engagement with a cooperating die aperture to punch a slug from said work-piece and lodge said screw in said work-piece.

11. An apparatus for retaining a screw in a holder before driving said screw into a work-piece comprising a nest to accommodate said screw, clutching means to retain said screw in said nest and means to guide said screw into proper engagement with a cooperating die aperture to punch a slug from said work-piece and lodge said screw in said work-piece including a guide washer on said screw remote from the head for engagement with another nest to guide said screw into said engagement.

12. A method of manufacture consisting in driving a plurality of screw mediums into lodging places formed in the work-piece by the threaded extremity of the screw mediums which passed therethrough and then forming an enlarged head on one end of each of said mediums in the same operating stroke of a machine.

13. A method of manufacture consisting in lodging a headed screw in a work-piece by placing within a guide means the screw and co-operating guide means yieldably secured to the punch end of said screw, then bringing said guided screw means against the work-piece, forcing said screw through the work-piece while guided by said guide means then bottoming said screw head against the co-operating guide means clamped between said screw head and the work-piece.

14. A method of manufacture consisting in placing a yieldable guide means on a headed screw, placing said screw assemblage in a guide means, forcing said screw through said yieldable guide means and a work-piece and then positioning said screw in said work-piece with said yieldable guide means between said screw head and the work-piece.

GEORGE F. WALES.

REFERENCES CITED

The following references are of record in the file of this patent:

UNITED STATES PATENTS

| Number | Name | Date |
|---|---|---|
| 254,731 | Trout | Mar. 7, 1882 |
| 471,084 | Hopkin | Mar. 15, 1892 |
| 473,791 | Simmonds | Apr. 26, 1892 |
| 588,236 | Noyes | Aug. 17, 1897 |
| 762,419 | Lawson | June 14, 1904 |
| 1,003,657 | Robertson | Sept. 19, 1911 |
| 1,018,741 | Davis | Feb. 27, 1912 |
| 1,061,480 | Kennedy | May 13, 1913 |
| 1,186,169 | Burgess | June 6, 1916 |
| 1,360,065 | Weiner | Nov. 23, 1920 |
| 1,365,869 | Temple | June 18, 1921 |
| 1,568,308 | Albee | Jan. 5, 1926 |
| 1,638,230 | Alasker | Aug. 9, 1927 |
| 1,797,702 | St. Pierre | Mar. 24, 1931 |
| 1,816,162 | Tolman | July 28, 1931 |
| 1,829,351 | Heames et al. | Oct. 27, 1931 |
| 2,112,284 | Gaess | Mar. 29, 1938 |
| 2,153,702 | Tighe | Apr. 11, 1939 |
| 2,274,899 | Johnson | Mar. 3, 1942 |
| 2,299,534 | De Lorme | Oct. 20, 1942 |
| 2,300,785 | Haydon | Nov. 3, 1942 |
| 2,362,039 | Whistler et al. | Nov. 7, 1944 |